United States Patent [19]
Strasser et al.

[11] Patent Number: 6,002,822
[45] Date of Patent: Dec. 14, 1999

[54] ARTICLE COMPRISING AN OPTIONAL WAVEGUIDE TAP

[75] Inventors: Thomas A. Strasser, Warren, N.J.; Jefferson Lynn Wagener, Charlottesville, Va.

[73] Assignee: Lucent Technologies Inc., Murray Hill, N.J.

[21] Appl. No.: 09/088,512

[22] Filed: Jun. 1, 1998

Related U.S. Application Data

[63] Continuation-in-part of application No. 08/741,439, Oct. 31, 1996, Pat. No. 5,832,156.

[51] Int. Cl.$^6$ .................................................. G02B 6/34
[52] U.S. Cl. .................................................. 385/48
[58] Field of Search ............................ 385/2, 4, 8, 10, 385/14, 15–17, 37, 40, 130–131, 901, 27; 65/400, 30.13

[56] References Cited

U.S. PATENT DOCUMENTS 5,061,032   10/1991   Meltz et al. .......................... 385/37

OTHER PUBLICATIONS

"Tilted Fiber Phase Gratings", by T. Erdogan et al., *J. Opt. Soc. Am. A*, vol. 13, No. 2, Feb. 1996, pp. 296–313.

*Primary Examiner*—Akm E. Ullah
*Attorney, Agent, or Firm*—Eugene E. Pacher

[57] ABSTRACT

A dispersive optical waveguide tap comprises a blazed refractive index grating in the core of the waveguide, coupling means, focusing means and utilization means. The grating is selected such that guided mode light of predetermined wavelength will, in the absence of the coupling means, be directed into one or more cladding modes of the waveguide. The presence of the coupling means, in optical co-operation with the waveguide, changes the guiding conditions such that the cladding modes are substantially eliminated from a portion of the waveguide that includes the cladding, whereby the grating directs the guided mode light into one or more radiation modes. The blaze angle typically is $\leq 15°$. The focusing means serve to bring the radiation mode light substantially to a focus in at least one dimension, the focal point (or line) depending on the wavelength of the light. The utilization means exemplarily comprise an array of photodetectors, and the coupling means exemplarily comprise an appropriately shaped glass member and index matching means. Dispersive waveguide taps are advantageously used in WDM optical communication systems, e.g., to provide status information (e.g., channel wavelength, channel power, including presence or absence of a channel) to, e.g., a system maintenance unit. The status information facilitates maintenance of operating conditions by conventional feedback control. Any optical element that can bring the tapped radiation to a focus on the utilization means can serve as a focusing element. Exemplary focusing elements are optical lenses (cylindrical or non-cylindrical), diffraction gratings, volume gratings (holograms), and combinations thereof.

18 Claims, 7 Drawing Sheets

ARTICLE COMPRISING AN OPTIONAL WAVEGUIDE TAP

REFERENCE TO RELATED APPLICATIONS

This application is a continuation-in-part application of application Ser. No. 08/741,439, filed Oct. 31, 1996, now U.S. Pat. No. 5,832,156.

FIELD OF THE INVENTION

This invention pertains to wavelength-selective means for coupling light from an optical fiber, and to articles (e.g., an optical amplifier) or systems (e.g., an optical fiber communication system; collectively "articles") that comprise such means.

BACKGROUND

In multi-wavelength optical fiber communication systems (usually referred to as "wavelength division multiplexed" or "WDM" systems), efficient wavelength-selective means for tapping electromagnetic radiation (to be referred to herein as "light", regardless of wavelength) from the optical fiber could be advantageously used in a variety of functions, e.g., as a wavelength monitor, channel monitor, demultiplexer, amplifier monitor, or in a feedback loop with an optical amplifier.

U.S. Pat. No. 5,061,032 to G. Meltz et al. discloses an optical fiber tap that comprises a blazed, chirped refractive index grating selected to redirect light guided in the fiber such that it comes to a focus at a point outside of the fiber. The patent also discloses that ". . . the angle of the external path that results in the constructive interference is peculiar to the respective central wavelength $\lambda$.".

The tap of the '032 patent has some shortcomings. For instance, due to the relatively large (exemplarily $\geq 22°$) blaze angle that is required to achieve the desired redirection of the light guided in the fiber core to light in space outside of the fiber, the arrangement is subject to undesirable polarization effects, i.e., the fraction of light that is redirected by the grating depends on the polarization of the incident guided light. Whereas for low blaze angles (<10°) the polarization dependent difference in the amount of redirected light is at most about 0.54 dB, this difference increases rapidly with increasing blaze angle, being about 2.86 dB and about 6.02 dB for blaze angles of 22° and 30°, respectively. Furthermore, as those skilled in the art will appreciate, the fraction of redirected light decreases with increasing blaze angle, for a given index change. See, for instance, T. Erdogan et al., *J. of the Optical Society of America-A*, Vol. 13(2), p. 296 (1996).

In view of the many important potential uses of an efficient, wavelength-selective fiber tap, it would be desirable to have available a fiber tap that is substantially free of the shortcomings of the above discussed prior art tap. This application discloses such a tap.

GLOSSARY AND DEFINITIONS

By "guided modes" we mean herein the propagating modes in the waveguide. The guided mode in a single mode conventional optical fiber is the $LP_{01}$ mode.

By "cladding modes", or "bound cladding modes" we mean herein optical modes of the waveguide structure that have an effective refractive index less than the refractive index of the cladding material of the waveguide. These modes are bound, in the sense that the optical power in these modes is always localized around the waveguide, and is not spreading out in a direction orthogonal to the propagation direction.

By "radiation modes" we mean herein optical modes that are not completely localized to the waveguide structure. Radiation modes spread away from the waveguide structure, such that at some point along the length of the waveguide there is an arbitrarily small amount of optical power located in the waveguide structure.

By a "non-guided mode" we mean herein a mode other than a guided mode, e.g., a cladding mode or a radiation mode.

A refractive index grating herein is "chirped" if the (optical) repeat distance $\Lambda$ of the index perturbations is not constant as a function of the axial coordinate z of the fiber, i.e., if $\Lambda=\Lambda(z)$.

A refractive index grating herein is "blazed" if the plane of the index perturbations in the waveguide is not perpendicular to the propagation direction of the guided mode or modes.

SUMMARY OF THE INVENTION

In a broad aspect the invention is embodied in an article (e.g., an optical waveguide communication system) that comprises an optical waveguide having a refractive index grating and coupling means selected such that at least a portion of the light is transferred from a guided mode into a radiation mode and is available for utilization by utilization means (e.g., a detector) outside of the waveguide and the coupling means.

More specifically, the invention is embodied in an article that comprises an optical waveguide for guiding light of wavelength $\lambda_i$ in at least one guided mode. The optical waveguide comprises a chirped and blazed refractive index grating selected such that at least a portion of the light in the guided mode is transferred into a non-guided mode. The article further comprises utilization means for utilizing the light in the non-guided mode.

Significantly, the article further comprises coupling means that are in optical cooperation with the waveguide such that said non-guided mode is a radiation mode. The grating has a blaze angle $\theta$ selected such that, in an otherwise identical comparison article that does not comprise said coupling means, the non-guided mode is a cladding mode. The grating furthermore has a chirp selected such that the light of wavelength $\lambda_i$ in the radiation mode is substantially brought to a focus in at least one dimension at a predetermined location outside said coupling means.

By way of explanation, the presence of the coupling means changes the waveguide properties in the vicinity of the grating such that the grating directs the light into a radiation mode or modes, rather than into a cladding mode or modes. This is typically accomplished by elimination of some or all of the cladding modes in the region of the index grating by physical means (designated the "coupling means") that will be described in detail below.

Although a waveguide tap according to the invention (i.e., a dispersive waveguide tap or DWT) can be advantageously used in a single wavelength optical waveguide system (e.g., to monitor the operating wavelength), such a tap will advantageously be used in a multiwavelength system, e.g., in a wavelength division multiplexed (WDM) optical fiber communication system.

BRIEF DESCRIPTION OF THE DRAWINGS

Same or analogous features in different figures will frequently be designated by same numerals. The figures are not to scale.

DETAILED DESCRIPTION

Figure 1:
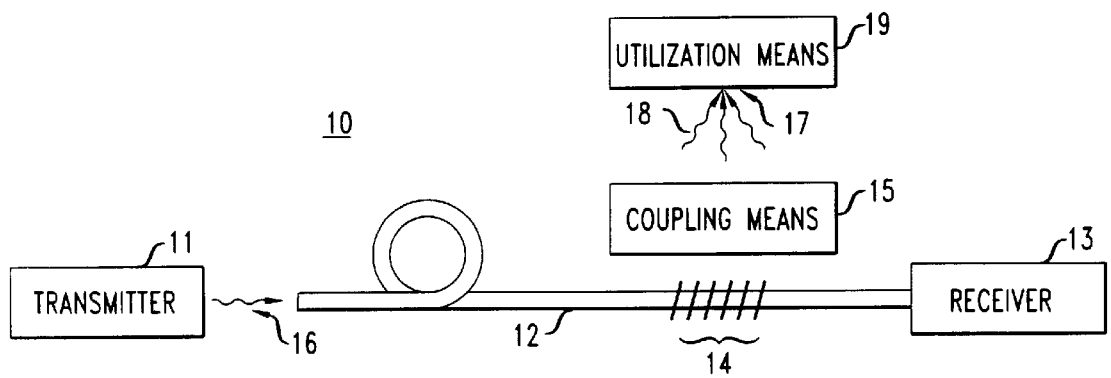
FIG. 1 schematically depicts an exemplary optical communication system according to the invention.

FIG. 1 schematically depicts an exemplary optical fiber communication system 10 according to the invention. Transmitter 11 provides signal radiation 16, exemplarily including light of wavelength $\lambda_i$. The signal radiation is coupled into conventional optical fiber 12 (typically a single mode fiber) in known fashion, and propagates in the fiber towards receiver 13. At an intermediate location in the fiber is provided blazed and chirped refractive index Bragg grating ("grating") 14. The grating is selected to direct, in optical co-operation with coupling means 15, guided mode light of a predetermined wavelength range (e.g., including $\lambda_i$) into a radiation mode or modes. For instance, light in $LP_{01}$ (the fundamental guided mode) is directed into radiation modes, as will be described in detail below. The coupling means, in co-operation with the fiber, not only ensure guided mode→radiation mode conversion but also allow spatial dispersion, such that light of wavelength $\lambda_i$ is substantially brought to a focus at a predetermined point outside of the coupling means (and not located at the waveguide boundary), and light of wavelength $\lambda_j \neq \lambda_i$ is substantially brought to a focus in at least one dimension at a different point. In FIG. 1, numeral 18 refers to light of wavelength $\lambda_i$ that is being brought to a focus at point 17. Utilization means 19 are positioned at or near the focal point.

It should perhaps be emphasized that the grating is selected such that, in the absence of the coupling means, the grating directs radiation from a guided mode (exemplarily $LP_{01}$) into a cladding mode (or modes) of the waveguide. This can be readily verified by conventional means, as will be evident to those skilled in the art. It is the presence (and optical co-operation with the fiber) of the coupling means that locally changes the optical characteristics of the fiber such that the light is directed from the guided mode into a radiation mode (or modes).

Figure 2:
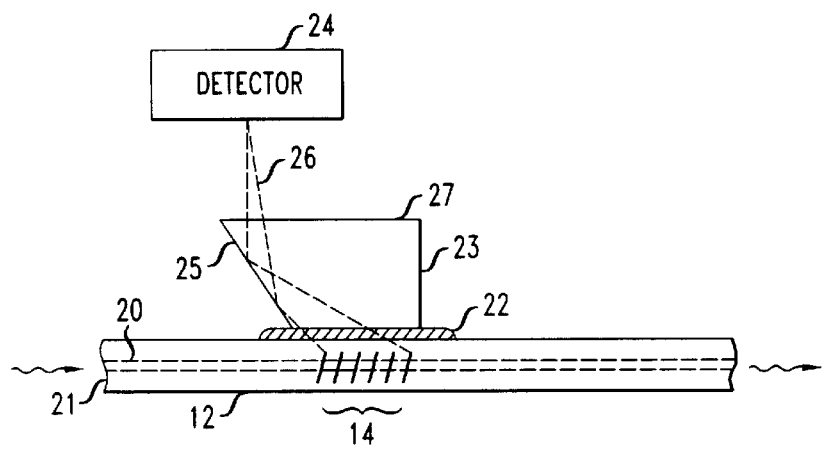
FIG. 2 shows schematically a relevant portion of an exemplary system including a blazed and chirped grating according to the invention.

FIG. 2 schematically shows an exemplary fiber tap according to the invention. Fiber 12 comprises a core 20 and a cladding 21. Grating 14 is formed in the core in conventional fashion. By way of example, the fiber was a conventional silica-based single mode fiber, and a grating was written into the fiber using a phase mask. The grating had a 9° tilt (blaze), a period $\Lambda(z)$ ranging linearly from 547.1 nm to 548.9 nm, and a Gaussian profile, with full width at half maximum (FWHM) of about 5 mm, corresponding to a linear chirp of about −3.6 nm/cm. Note that a negative chirp corresponds to decreasing grating period in the downstream direction.

Numeral 22 refers to an index matching medium, e.g., Cargill Oil, with refractive index chosen to be at or slightly above the refractive index of silica. Such matching eliminates the fiber cladding as a guiding structure, and allows the light that otherwise would have been directed into the cladding mode (or modes) by the grating to propagate at a low angle (e.g., $\leq 45°$) away from the fiber. Cargill Oil is not the only suitable index matching medium. For instance, index matched epoxy can be used to additionally bond member 23 to the fiber.

Member 23 exemplarily is a glass block configured such that the light of a given wavelength substantially comes to a focus (in at least one dimension) at a convenient point in space. For instance, face 25 of the glass block is inclined such that light beam 26 is redirected by total internal reflection, and exits from the block approximately normally to face 27. Note that non-normal incidence reduces backreflection into the waveguide. Detector 24 receives the light and provides a responsive electrical signal.

The arrangement of FIG. 2 is exemplary only, and many other arrangements are possible. For instance, a detector array could be disposed on face 25 of glass block 23, the array serving to receive spatially dispersed light of various wavelengths. By way of further example, optical fibers can be positioned to receive the spatially dispersed light, as those skilled in the art will recognize.

Figure 3:
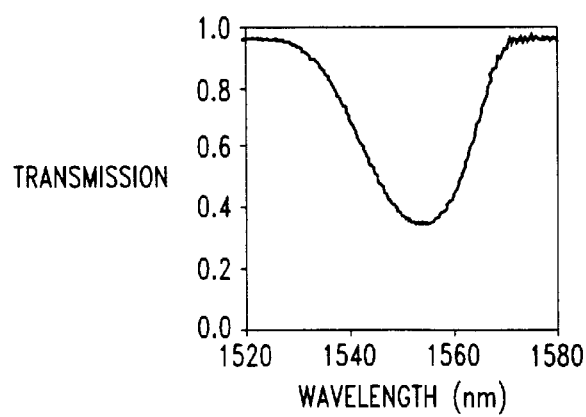
FIG. 3 shows an exemplary transmission spectrum.

FIG. 3 shows the transmission spectrum of a fiber DWT substantially as described above. The grating couples (in the absence of coupling means) about 50% of the single mode light in the 1540–1565 nm wavelength region to a cladding mode or modes.

The strength of the grating, and thus the fraction of the guided light that will be coupled out of the fiber in a given wavelength range, can be readily selected (for a given grating length, chirp and blaze angle) by appropriate choice of the amount of index perturbation in the grating. Whereas some applications may require strong gratings (e.g., 90% or even essentially 100%), other applications may require weak (e.g., ~10% or even less) or intermediate strength (e.g., 20–80%) gratings.

Figure 4:
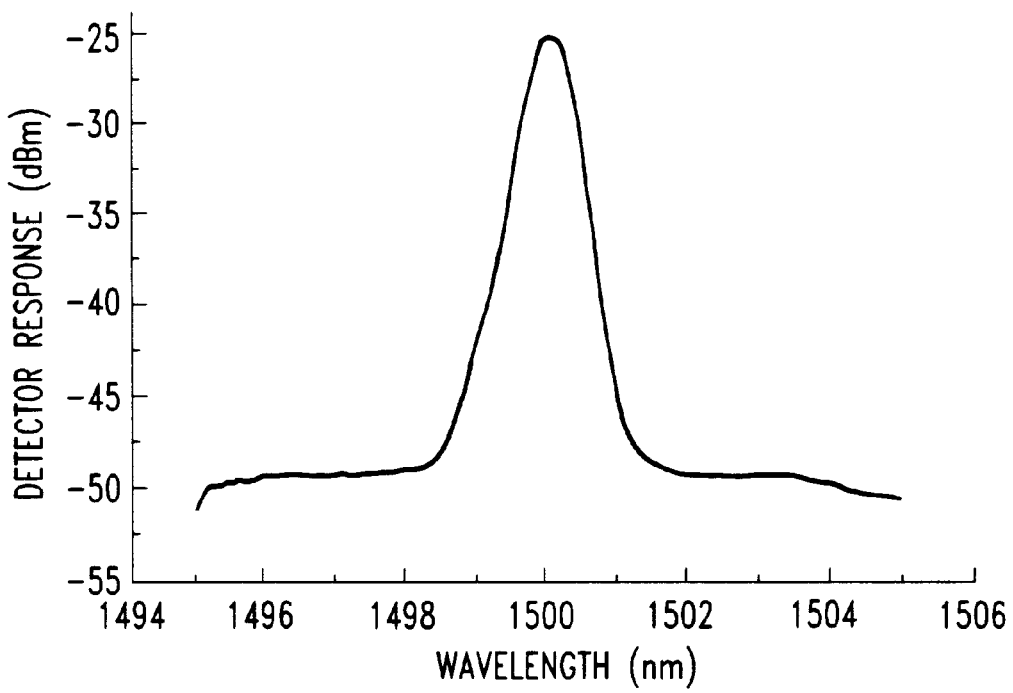
FIGS. 4 and 5 illustrate spatial dispersion of a DWT according to the invention, FIG. 6 schematically depicts relevant features of an exemplary DWT according to the invention, the tap embodied in planar waveguide technology.

FIG. 4 illustrates attainable spatial dispersion. The figure shows the output of a single detector 24 in an arrangement similar to that of FIG. 2. The grating spectrum was centered at about 1500 nm. As can be seen, a small wavelength band (e.g., less than 1.5 nm) can be readily isolated. Using a detector array, multiple wavelengths can be resolved and detected simultaneously over a relatively large bandwidth (e.g., 20–50 nm).

Figure 5:
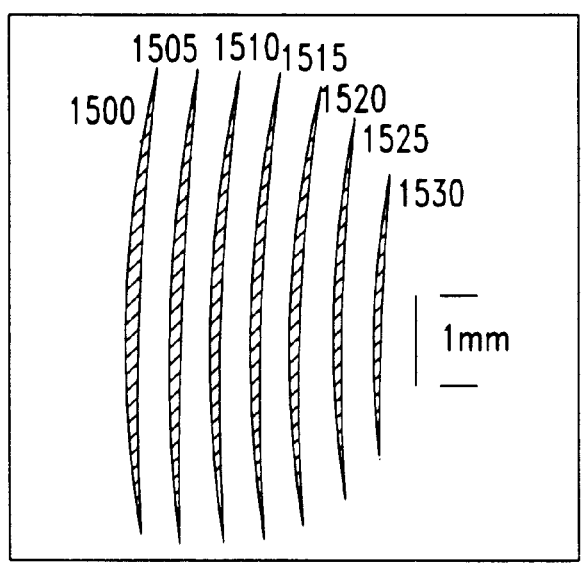

FIG. 5 also illustrates attainable spatial dispersion, by showing the different spatial locations at different wavelengths. The grating spectrum was centered at about 1515 nm. As can be seen, light is substantially brought to a line focus but could, if desired, be brought substantially to a point focus.

As disclosed above, in preferred embodiments of the invention the DWT is a blazed and chirped refractive index grating. The blaze serves to enhance the coupling from the guided mode to the cladding mode in the fiber (without coupling means present). The blaze angle typically is less than about 15°, with the choice of blaze angle depending on tolerable polarization dependence and desired mode coupling efficiency. The higher the blaze angle, the more polarization-dependent will be the grating characteristics. For example, a blaze of 8° shows less than 0.35 dB of polarization sensitivity in coupled power. On the other hand, for a given refractive index change, the coupling efficiency drops with increasing blaze angle. Consideration can also be given to the fact that azimuthal confinement of the light depends on blaze angle. For higher blaze angles, the azimuthal spreading of the coupled light is decreased (e.g., about 5° spread for a 9° blaze angle). This is desirable to increase the fraction of the coupled light that reaches the utilization means.

The chirp of the grating serves to provide spatial dispersion of the light coupled from the fiber. Although the optimal chirp for any given wavelength can be determined by Bragg diffraction theory, a linear chirp frequently provides a good approximation to the optimal chirp. The magnitude of the chirp determines the focal distance, with the focal distance decreasing with increasing chirp. For example, for a 2 mm long grating with a starting period of 533 nm and a blaze of 8 degrees, the focal distance for 1550 nm light is about 1 cm with a −5 nm/cm grating chirp. As the chirp is increased to −10 nm/cm the focal length drops to about 0.5 cm, and conversely if the chirp is decreased to −2.5 nm/cm, the focal length increases to about 2 cm.

For a given length of grating, the larger the focal length, the better a linear chirp approximates the optimum chirp. It is therefore desirable not to have a grating with an excessively large chirp, which may yield optimal characteristics for one wavelength but may not even be close to optimum for another. Chirps of less than 10 nm/cm are desirable to yield good spectral resolution. In the above described grating, a chirp of −10 nm/cm can yield a 1 nm possible spectral resolution, while the −5 nm/cm chirp can give 0.25 nm possible resolution, and the −2.5 nm/cm chirp can give sub-angstrom resolution.

The detected resolution also depends on the effective width of the line focus and the spatial separation of different wavelengths. FIG. 5 shows the spatial separation of wavelengths spaced 5 nm apart in the 1500 to 1530 nm range. It also shows the finite width (spot size) of the line focus at any particular wavelength. The product of the line focus width and the wavelength spacing per unit length gives a lower bound on the obtainable resolution with any detector slit size (e.g., about 1 nm for wavelengths depicted in FIG. 5). The grating blaze angle and the location of the utilization means predominately determine the wavelength spacing per unit length, with the spacing growing as the utilization means are located further from the grating. The length of the index grating along with the chirp rate determine the width of the line focus, thereby determining the expected best resolution.

In the cases of relatively low chirp, the actual detected resolution typically will not be limited by the chirp function, but instead by the grating length and strength, the grating apodization, and the effective detection slit width. The lower limit on the chirp rate typically is determined by the longest practical focal length, and is exemplarily on the order of 0.5 nm/cm.

A grating can be written in a planar waveguide as well as in optical fiber (not necessarily limited to conventional circularly symmetric optical fiber. For instance, fibers having at least one planar surface, e.g., a fiber with "D" cross section, or a fiber with substantially square cross section are contemplated), as will be recognized by those skilled in the art. Indeed, the invention can be embodied in planar waveguides, by appropriate adaptation of the above disclosed structures and techniques. As in optical fiber, it is advantageous to provide a planar waveguide having a relatively small number of cladding modes. Exemplarily, a tap according to the invention can be embodied in a structure 60 as depicted schematically in FIG. 6.

Figure 6:
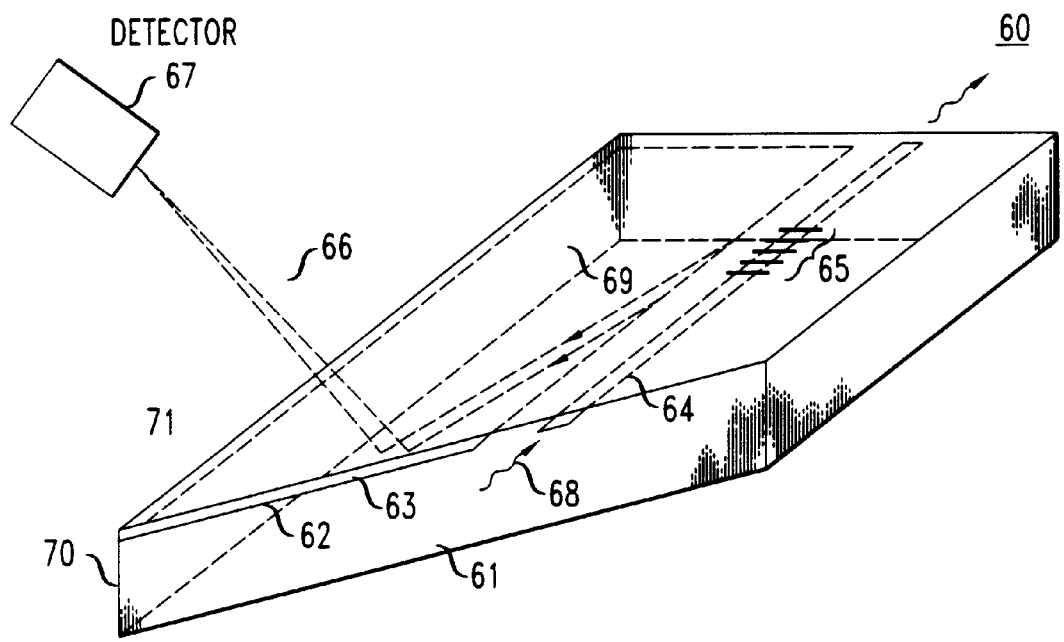

In FIG. 6, numeral 61 refers to a substrate body, exemplarily a portion of a Si wafer. Numeral 62 indicates a planar waveguide layer, exemplarily comprising an $SiO_2$ lower cladding layer, a phosphosilicate core layer disposed on the lower cladding layer, and a boro-phospho-silicate upper cladding layer. Such planar waveguide structures are well known and do not require elaboration. The waveguide layer is patterned (e.g., by conventional photolithography) to provide conventional planar (linear) waveguide 64 and two-dimensional planar waveguide 69. The two guides (64 and 69) are spaced apart but are close enough to provide optical cooperation between the guides in the grating region 65. On the patterned waveguide layer optional cover layer 63 (e.g., B- and P-doped $SiO_2$) can be disposed. In the core of a portion of linear waveguide 64 is formed blazed and chirped refractive index grating 65 by UV exposure. The core of linear waveguide 64 exemplarily is selected such that the waveguide is a single mode waveguide for radiation 68 of the desired wavelength. The radiation is coupled into the linear waveguide by conventional means, propagates to the grating where at least some of the radiation is directed into a non-guided mode or modes. Due to the cooperation between the linear waveguide 64 and the 2-dimensional planar waveguide 69, cladding modes of the linear waveguide 64 are substantially eliminated in the vicinity of the grating, and the light is directed into a radiation mode or modes, and propagates in the 2-dimensional planar waveguide towards angled surface 70, where the light is reflected toward surface 71 and utilization means 67.

As will be evident from the above description, the 2-dimensional planar waveguide 69 functions as the coupling means, and the embodiment of FIG. 6 is functionally equivalent to the embodiment of FIG. 2. The 2-dimensional planar waveguide confines the light in the direction normal to the waveguide layer, but does not provide guiding in the plane of the waveguide.

Figure 7:
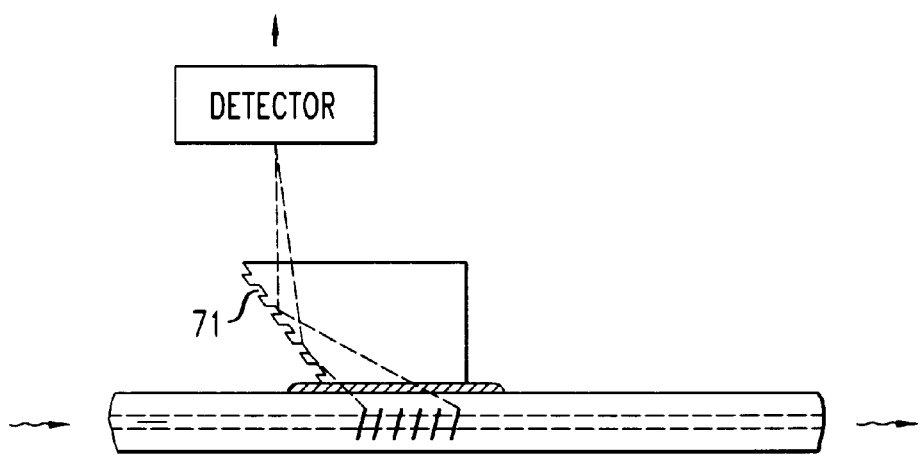
FIG. 7 schematically depicts a further embodiment of a DWT according to the invention.

The above described embodiments are exemplary only, and variations of the basic scheme can be devised. For instance, provision of an additional dispersive element can result in improved spectral resolution of the DWT. Exemplarily the dispersive element is a grating provided on a surface of the coupling means, as is schematically indicated in FIG. 7 (wherein numeral 71 refers to the grating), or is a volume grating (e.g., a hologram) in the coupling means. Other arrangements are possible. For instance, a conventional prism can be placed into the beam path, e.g., be disposed on surface 27 of FIG. 2.

FIG. 7 (and FIG. 2) shows only a single wavelength tapped from the fiber and received by the detector. This is for reason of clarity only, and it will be understood that generally a multiplicity of wavelengths will be tapped from the fiber by a DWT and will be received by a multiplicity of detectors (or optical waveguides).

Figure 8:
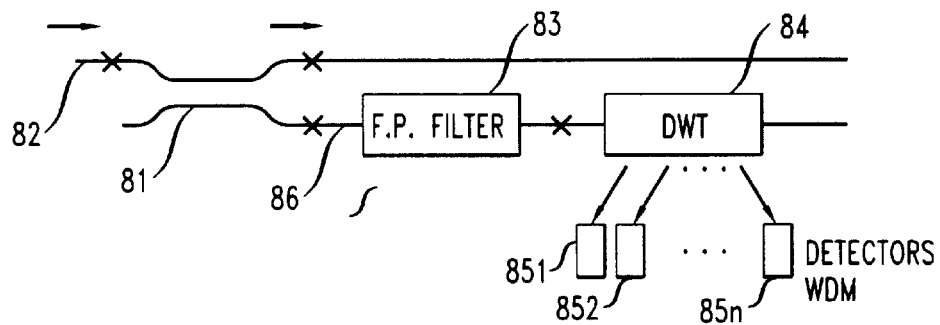
FIG. 8 schematically depicts a relevant portion of an exemplary optical communication system according to the invention.

In a further embodiment, a filter (e.g., a fiber Fabry-Perot filter or a conventional bulk Fabry-Perot) is disposed just upstream of a DWT, as is shown schematically in FIG. 8, wherein an optional conventional coupler 81 couples a small fraction (e.g., 5%) of multichannel signal power from fiber 82. The coupled-out light propagates through fiber 86 to Fabry-Perot filter 83. The filter is selected to have very narrow transmission bands centered at $\lambda_1, \lambda_2 \ldots \lambda_n$. Light of these wavelengths thus passes through the filter and propagates to DWT 84 where the spectrum is spatially dispersed and detected by detectors 851, 852 . . . 85n. The combination of FIG. 8 is advantageously used in a WDM optical communication system comprising a feedback loop for locking the WDM transmitter (not shown) to the correct wavelengths ($\lambda_1, \lambda_2, \ldots \lambda_n$) and channel power pre-emphasis. Such a feedback loop needs to exhibit high spectral resolution (typically <0.1 nm). Such resolution is readily attainable by means of a filter/DWT combination according to FIG. 8. Of course, DWT 84 could be a tap of the kind shown in FIG. 7, to provide increased spatial separation of the various wavelengths.

It will be understood that "dispersive waveguide taps or "DWTs" are devices that can remove light from a waveguide and spectrally disperse the removed light such that light of different wavelengths is available for utilization (e.g., detection) at different respective locations in space. The above described tap according to the invention is an exemplary and advantageous embodiment of a DWT.

DWTs can advantageously be used in multichannel WDM communication systems, as will be exemplified below. The DWTs exemplarily are used to perform functions that, if performed at all in prior art systems, were performed by more expensive and/or less effective means.

In the prior art, conventional (non-dispersive) fiber taps were employed in single channel systems for e.g., detection of the presence or absence of the channel, for adjustment of an optical amplifier's pump power to maintain the same operation point (compression) for widely varying input powers. The prior art also contains WDM systems that use conventional (non-dispersive) fiber taps. These systems use "tones" (i.e., low frequency amplitude or frequency variations of the signal power of the various channels) to identify the fraction of each wavelength contributing to the total power.

This approach however has shortcomings. For instance, placement of tones on information signals frequently leads to degradation of transmission quality, and the presence of tones can lead to crosstalk, possibly resulting in false readings of channel presence and/or power. Use of DWTs can not only overcome prior art shortcomings but can inexpensively and simply provide novel system functions, typically feedback functions that facilitate system management.

Figure 9:
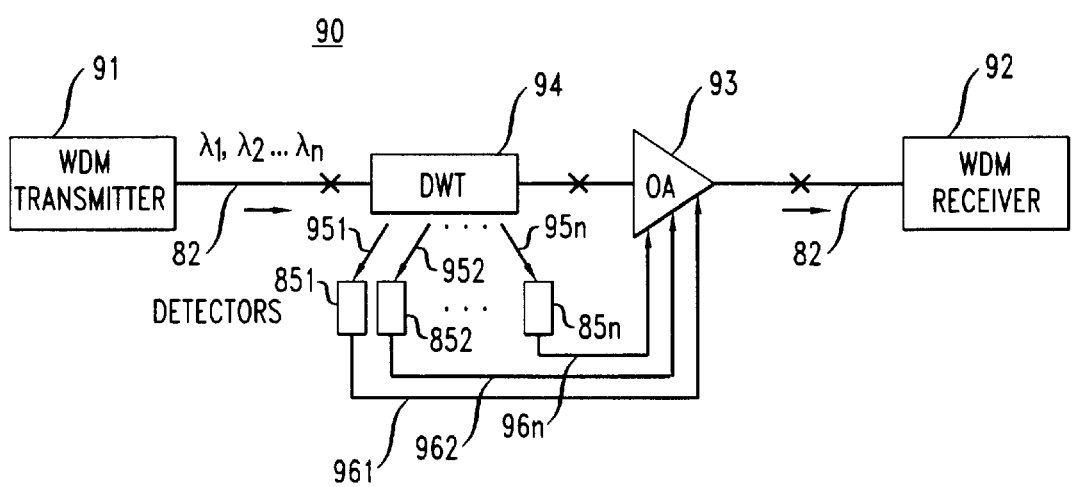
FIGS. 9–11 schematically depict exemplary communication systems that utilize DWTs.

FIG. 9 schematically shows an exemplary optical fiber communication system 90 with feedback control of optical amplifier 93. The system comprises WDM transmitter 91, WDM receiver 92, and an optical fiber transmission path signal-transmissively connecting transmitter and receiver. The transmission path comprises conventional transmission fiber 82, a DWT that couples a predetermined small fraction (e.g., 5%) of the signal power from the transmission path, and conventional optical amplifier (e.g., EDFA) 93. The signal radiation comprises n channels of wavelength $\lambda_1$, $\lambda_2, \ldots \lambda_n$. DWT 94 disperses the coupled-out signal power into n optical beams 951–95n, substantially of wavelengths $\lambda_1 \ldots \lambda_n$, respectively. These beams are detected by means of conventional detectors 851 . . . 85n, respectively, and the resulting electrical signals 961 . . . 96n are fed to control apparatus of the optical amplifier 93, where they are utilized in conventional fashion to adjust one or more operational characteristics of the amplifier, e.g., pump power (and potentially gain shape), to attain or maintain desired systems characteristics, e.g., to enable the optical amplifier to maintain constant output conditions for all active channels, even if the input level or number of channels unexpectedly changes. It will be appreciated that an optical amplifier with control apparatus, DWT, detectors and electrical connections can be provided in a single unit, and such units are contemplated.

Figure 10:
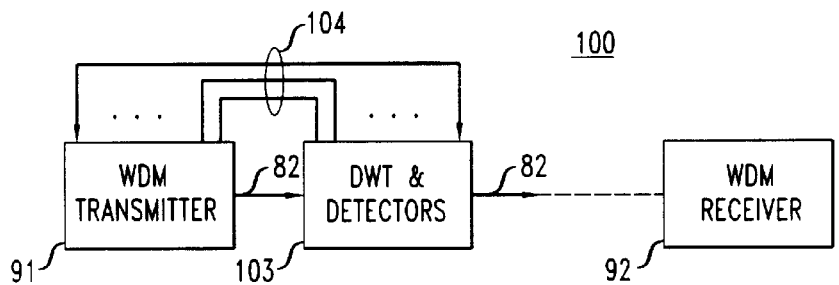

FIG. 10 schematically depicts another exemplary optical fiber WDM communication system with feedback control. The system comprises n-channel WDM transmitter 91, WDM receiver 92, fiber path 82, and DWT (with detectors) 103. The transmitter can contain discrete radiation sources (typically lasers) or one or more multiwavelength sources (typically also lasers). In either case, electrical outputs 104 of the detectors are fed to the transmitter, where they are utilized to maintain the n channels aligned with respect to, e.g., wavelength and/or power. Such alignment can be achieved in conventional fashion using feedback. For instance, wavelength is maintained by means of temperature control, and power is maintained by means of drive current control.

Figure 11:
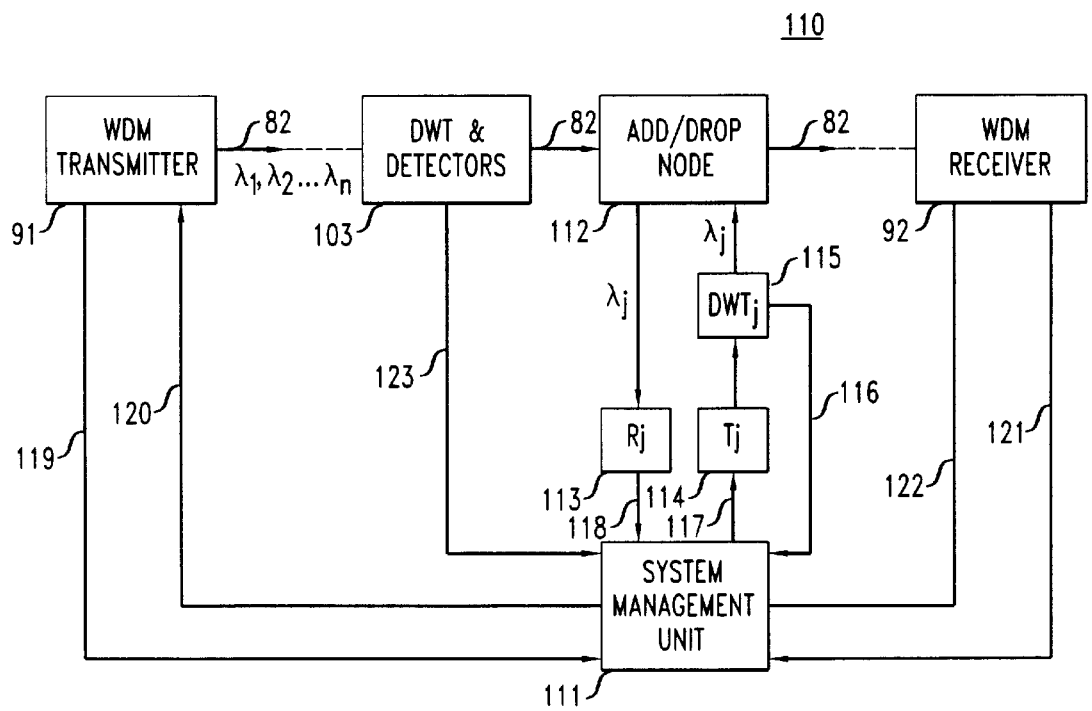

FIG. 11 schematically depicts a further exemplary WDM optical fiber communication system with feedback control. It will be understood that actual WDM systems will typically comprise a multiplicity of add/drop nodes 112, spaced along the transmission path, and serving to remove one or more channels (e.g., $\lambda_j$) from the transmission path, and to add one or more channels (e.g., $\lambda_j$).

The WDM transmitter provides n channels, exemplarily as shown in FIG. 10. DWT (and detectors) 103 extracts information (e.g., which channels are present at what power, wavelength of each channel) from the mutiplexed optical signal that arrives at DWT 103, and provides corresponding electrical signals to system management unit (SMU) 111. The optical WDM signal then is provided to add/drop node 112, where channel $\lambda_j$ is dropped and new channel $\lambda_j$ is added, both in conventional fashion. The dropped channel is detected in drop channel receiver 113. Electrical signal 118 is provided to SMU 111. Add channel transmitter 114 provides optical channel $\lambda_j$ to add channel DWT 115 (or other suitable tap; e.g., a prior art single wavelength tap), with the DWT providing electrical signal 116 to the SMU, which in turn provides electrical control signal 117 to transmitter 114. Optical channel $\lambda_j$ is provided to add/drop node 112 and is added to the WDM signal stream propagating towards WDM receiver 92. Both WDM transmitter 91 and WDM receiver 92 are under the control of SMU 111, as indicated by electrical signals 119 and 120, and 121 and 122, respectively.

It will be understood that the SMU is not necessarily a single discrete unit but can (and frequently will) be distributed. It will also be understood that the system of FIG. 11 is exemplary only, and that many variations are possible. For instance, one or more of the detectors of a given DWT, could be detectors of a receiver. However, in common with the examples presented above, WDM optical fiber communication systems according to the invention utilize DWTs to provide signals that are representative of channel wavelength(s), and/or channel power(s) including presence or absence of power in a channel, and that facilitate system management by means of a variety of feedback loops. Feedback loops per se are of course well known and those skilled in the art will be readily able to implement feedback loops that provide specific functions and utilize DWTs. We believe that such WDM systems will be substantially free of the above described shortcomings of prior art WDM systems that utilize tones to convey the control information. We also believe that this technical advance is attainable at relatively modest cost, due to the relative simplicity and low cost of DWTs associated detectors.

EXAMPLE I

Conventional 5D® single mode silica-based fiber, with germanium-doped core, was deuterium-loaded in conventional fashion, and exposed to 242 nm laser radiation through a phase mask to form a blazed and chirped Bragg grating in the fiber. The fiber was tilted 9 degrees with respect to the phase mask, i.e., the blaze angle was 9°. The phase mask had a center period of 1.114 µm, with a chirp of −2.47 nm/cm. The UV intensity was Gaussian along the length of the fiber, with full width at half maximum of 1 cm. The grating growth was monitored in conventional fashion, and the exposure was stopped when the desired grating depth was reached. After annealing the fiber with the grating therein at 140° C. for 12 hours, the grating coupled about 15% of light from the guided mode to a non-guided mode or modes (primarily cladding modes), for light in a 55 nm range centered at 1545 nm. It is verified that, with the fiber in air and no object within coupling distance of the fiber in the grating region, the grating couples a negligible amount of the guided mode power into a radiation mode or modes.

A 3 cm×1 cm×0.1 cm silica slab was used as the coupling means. One short side of the slab was cut and polished at a 124° included angle with one of the long sides of the slab, and that long side was polished. The bare fiber was then epoxy bonded to the polished long side such that the fiber was positioned along the center of the 3 cm×0.1 cm side, with the grating centered along the length of the side, and with the blaze of the grating pointing into the slab. This is achieved by maximizing, before the epoxy cures, the amount of 1545 nm light that is coupled from the fiber into the slab. The epoxy was conventional epoxy, with refractive index at 1550 nm matched to that of silica. The fiber was disposed such that the grating period increased in the direction from the squared off end of the slab to the angled end thereof. After curing of the epoxy the bare fiber and the epoxy bond were coated with a conventional polymer fiber coating.

A detector array was disposed 20 cm from the fiber, facing the fiber and parallel thereto. The array consisted of 512 InGaAs conventional detection elements, with 50 µm center spacing. Each element was 30 µm wide and 500 µm long. The array covered about 40 nm of optical bandwidth, with just under a 0.1 nm spacing between the center wavelengths of adjacent elements. When light was propagated in the fiber direction from the longer grating period to the shorter grating period, the power at each element was recorded sequentially in time and related to the center wavelength detector by the respective elements. Thus the optical power spectrum of the light was determined. This established functioning of the DWT as intended.

The above description of a dispersive waveguide tap (DWT) is in terms of an exemplary DWT that utilizes a blazed and chirped grating. However, the invention is not limited to the use of a chirped blazed grating. Generally speaking, the invention is embodied in an article that comprises a DWT that comprises a blazed Bragg grating, coupling means, and focusing means that are selected to substantially bring to a focus at a predetermined location the light of a given wavelength. In the above described embodiments focusing generally was provided by the grating chirp, with other dispersive elements (e.g., a grating on a surface of the coupling means, as shown in FIG. 7; or a volume grating in the coupling means) dislcosed as useful for, e.g., improving the spectral resolution.

However, a DWT according to this invention does not require a chirped blazed grating since an appropriately blazed grating (blazed as described above) provides spatial dispersion of the coupled-out light, and a focusing element (e.g., a cylindrical lens, a non-cylindrical lens, a diffraction grating, a volume hologram) or combination of such focusing elements, can provide the focusing. This is exemplified by FIG. 7 if the grating in the fiber is assumed to be a chirp-free grating. Indeed, chirp-free DWTS can have advantages over DWTs with chirped grating.

Figure 12:
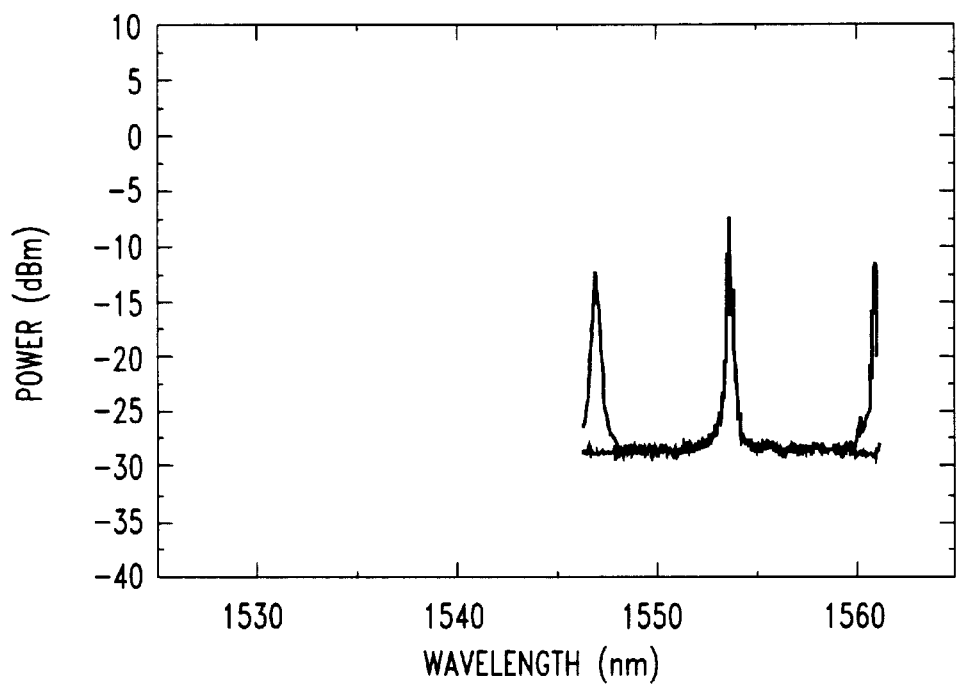
FIG. 12 shows the bandwidth response of an exemplary DWT with chirped grating, without lens.

DWTs with chirped grating are most easily implemented with linear chirp. Such a DWT however has, for short focal length, high spectral resolution only over a relatively narrow wavelength range (e.g., about 10 nm), because the spatial focusing can be optimized only over this narrow wavelength range. This is exemplified in FIG. 12, which shows the significant change in resolution over a 10 nm bandwidth. The data was taken with a DWT with chirp but without any other focusing element. The region of high spectral resolution could be extended by the use of appropriate non-linear chirp, but gratings with non-linear chirp are difficult to manufacture.

DWTs with chirped, blazed grating are also difficult to manufacture since the wavelength resolution is very sensitive to fiber grating twist, as such twist impacts the minimum focused spot size at a given wavelength.

Figure 13:
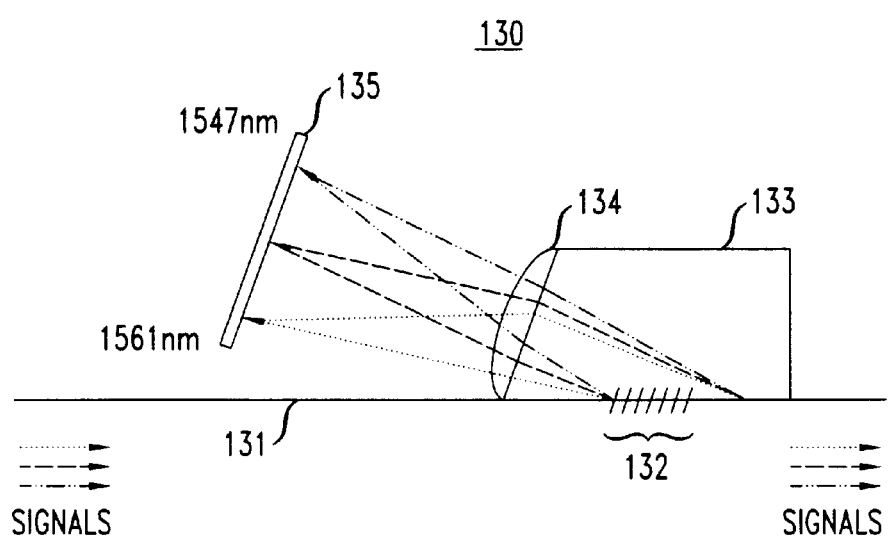
FIGS. 13 and 15 show exemplary embodiments of DWTs without chirped grating, with lens.

FIG. 13 schematically depicts an exemplary DWT 130 without chirped grating. Numerals 131–135 refer, respectively, to single mode optical fiber, aun-chirped blazed grating, a glass block (coupling means), a cylindrical lens, and a conventional detector array. Light of different wavelengths is brought to a (line) focus at different points of the detector array.

Figure 14:
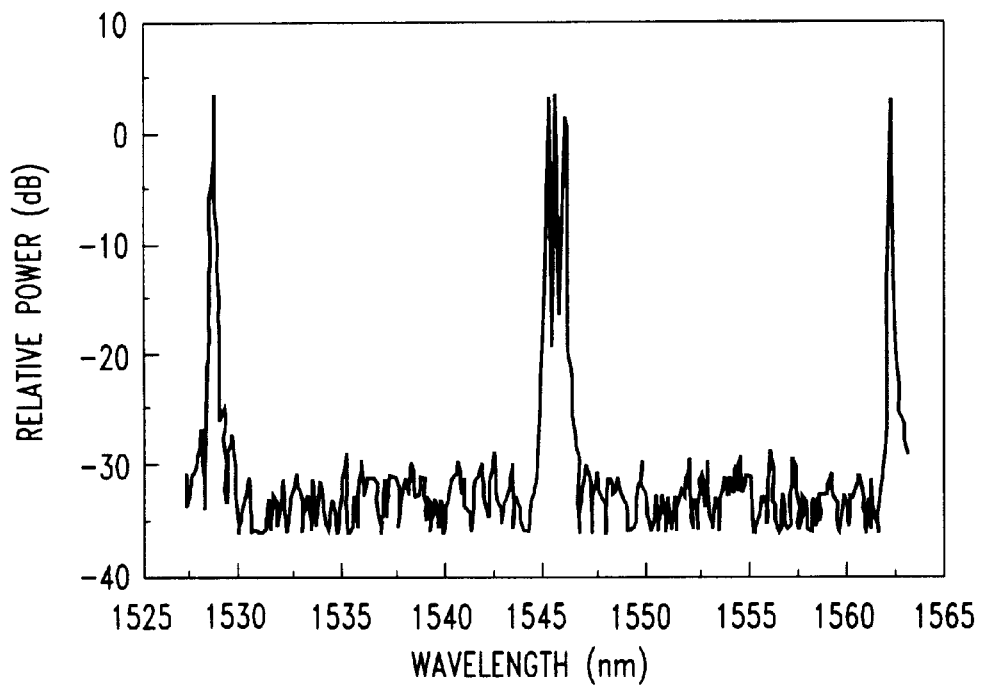
FIG. 14 shows the bandwidth response of an exemplary DWT without chirped grating, with lens.

FIG. 14 shows the bandwidth response of an exemplary DWT as shown in FIG. 13, without chirp but with a cylindrical lens. The higher bandwidth and good resolution of this arrangement is apparent.

Figure 15:
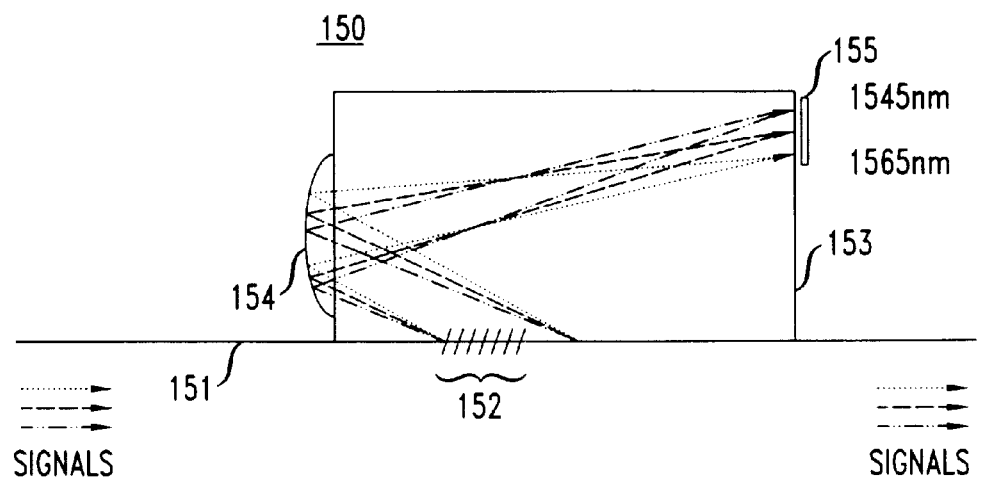

FIG. 15 schematically depicts another exemplary DWT 150, with numerals 151–155 referring, respectively, to single mode optical fiber, a (un-chirped) grating, a glass block (coupling means), a cylindrical lens, and a conventional detector array.

DWTs without chirped grating can be used in substantially the same manner as those with chirped grating, as those skilled in the art will recognize. They will also recognize that practice of the invention is not limited to the use of the above recited focusing elements, and that any element that can provide the desired focusing can be used.

EXAMPLE II

Conventional 5D® single mode silica-based fiber, with germanium-doped core, was deuterium-loaded in conventional fashion, and exposed to 242 nm laser radiation through a phase mask to form a blazed Bragg grating in the fiber. The fiber was tilted 9 degrees with respect to the phase mask, i.e., the blaze angle was 9°. The phase mask had a constant period of 1.114 µm. The UV intensity was Gaussian along the length of the fiber, with full width at half maximum of 2.5 cm. The grating growth was monitored in conventional fashion, and the exposure was stopped when the desired grating depth was reached. After annealing the fiber with the grating therein at 140° C. for 12 hours, the grating coupled about 10% of light from the guided mode to a non-guided mode or modes (primarily cladding modes), for light in a 55 nm range centered at 1545 nm. It is verified that, with the fiber in air and no object within coupling distance of the fiber in the grating region, the grating couples a negligible amount of the guided mode power into a radiation mode or modes.

A 10 cm×7 cm×1 cm silica slab was used as the coupling means. One short side of the slab was cut and polished at a 97° included angle with one of the long sides of the slab, and that long side was polished. In addition, the remaining 7 cm long side was polished. On the angled face, a 2.5 cm long cylindrical lens was bonded with index-matched epoxy, with an edge aligned with the long polished face. The lens focal length was 8 cm, with the curved surface forming an arc in the plane of the slab. The curved surface was coated to be highly reflective for 55 nm centered around 1545 nm. The bare fiber was then epoxy bonded to the polished long side such that the fiber was positioned along the center of the 10 cm×1 cm side, with the grating centered along the length of the side, and with the blaze of the grating pointing into the slab. This is achieved by maximizing, before the epoxy cures, the amount of 1545 nm light that is coupled from the fiber into the slab. The epoxy was conventional epoxy, with refractive index at 1550 nm matched to that of silica. After curing of the epoxy the remaining bare fiber was coated with a conventional polymer fiber coating. The two 10 cm×7 cm faces of the slab where painted flat black, along with the face the fiber was bonded to and the opposite face.

A detector array was disposed 8 cm from the mirrored lens, facing the concave mirrored lens surface, and oriented in the plane of the slab. The array consisted of 256 InGaAs conventional detection elements, with 50 μm center spacing. Each element was 30 μm wide and 256 μm long. The array covered about 40 nm of optical bandwidth, with under a 0.2 nm spacing between the center wavelengths of adjacent elements. When light was propagated in the fiber, the power at each element was recorded sequentially in time and related to the center wavelength detector by the respective elements. Thus the optical power spectrum of the light was determined. This established functioning of the DWT as intended.

The invention claimed is:

1. An article comprising an optical waveguide for guiding light, including light of wavelength $\lambda_i$, in at least one guided mode; the optical waveguide comprising a tap for coupling light of wavelength $\lambda_i$ from the optical waveguide, the tap comprising a blazed refractive index grating selected to direct at least some of said light of wavelength $\lambda_i$ from said guided mode into a non-guided mode; and the article further comprises utilization means for utilizing the light of wavelength $\lambda_i$ in said non-guided mode;

CHARACTERIZED IN THAT a) the tap is a dispersive waveguide tap and further comprises coupling means that are in optical co-operation with the optical waveguide such that said non-guided mode is I1 a radiation mode, with said light of wavelength $\lambda_i$ in the radiation mode being available for utilization by the utilization means;

b) the refractive index grating is selected such that, in an otherwise identical comparison tap that does not comprise said coupling means in optical co-operation with the optical waveguide, at least a part of said light of wavelength $\lambda_i$ is directed into a cladding mode in the optical waveguide; and c) the article comprises focusing means selected such that the light of wavelength $\lambda_i$ in the radiation mode is substantially brought to a focus in at least one dimension at a first predetermined location outside the coupling means.

2. Article according to claim 1, wherein the focusing means comprise an optical lens.

3. Article according to claim 1, wherein the focusing means comprise a volume grating or a diffraction grating.

4. Article according to claim 1, wherein the optical waveguide is further adapted for guiding light of wavelength $\lambda_j$ different from $\lambda_i$ in the at least one guided mode, the refractive index grating is selected such that at least some of said light of wavelength $\lambda_j$ is directed into the radiation mode, and the focusing means are selected such that the light of wavelength $\lambda_j$ in the radiation mode is brought to a focus in at least one dimension at a second predetermined location different from the first predetermined location.

5. Article according to claim 1, wherein the blazed refractive index grating has a blaze angle $\leq 15°$.

6. Article according to claim 1, wherein said coupling means in optical cooperation with the waveguide serve to substantially eliminate said cladding mode in the optical waveguide in a portion of the optical waveguide that includes the refractive index grating.

7. Article according to claim 6, wherein said optical waveguide is an optical fiber, and wherein said coupling means comprise a member that is substantially transparent for said light of wavelength $\lambda_i$.

8. Article according to claim 6, wherein said optical waveguide is a linear planar optical waveguide, and wherein said coupling means comprise a 2-dimensional planar optical waveguide spaced from said planar linear optical waveguide, the spacing between said linear and 2-dimensional optical waveguides selected to facilitate said optical cooperation between the waveguides.

9. Article according to claim 4, wherein the utilization means comprise means for receiving the light of wavelength $\lambda_i$ and $\lambda_j$ substantially at respectively said first and second predetermined locations.

10. Article according to claim 9, wherein said means for receiving the light of wavelength $\lambda_i$ is a member of an array of distinct means for receiving light.

11. Article according to claim 10, wherein said distinct means for receiving light are optical fibers.

12. Article according to claim 10, wherein said distinct means for receiving light are photodetectors.

13. Article according to claim 4, wherein the dispersive waveguide tap further comprises light dispersive means disposed between said waveguide and said utilization means and adapted to improve resolution between light of wavelength $\lambda_i$ and $\lambda_j$.

14. Article according to claim 13, wherein said light dispersive means comprise a grating disposed on a surface of said coupling means.

15. Article according to claim 13, wherein said light dispersive means comprise a volume grating in said coupling means.

16. Article according to claim 7, wherein said optical fiber has a cross section with at least one substantially flat portion.

17. Article according to claim 16, wherein the fiber has a substantially square cross section.

18. Article according to claim 2, wherein the optical lens is a cylindrical lens.

* * * * *